United States Patent
Fujita et al.

(10) Patent No.: US 10,154,248 B2
(45) Date of Patent: Dec. 11, 2018

(54) ENCODER APPARATUS, ENCODER SYSTEM, ENCODING METHOD, AND MEDIUM FOR SEPARATING FRAMES CAPTURED IN TIME SERIES BY IMAGING DIRECTIONS

(71) Applicant: FUJITSU LIMITED, Kawasaki-shi, Kanagawa (JP)

(72) Inventors: Ryuhei Fujita, Kawasaki (JP); Kouichi Abe, Kawasaki (JP)

(73) Assignee: FUJITSU LIMITED, Kawasaki-Shi (JP)

(*) Notice: Subject to any disclaimer, the term of this patent is extended or adjusted under 35 U.S.C. 154(b) by 53 days.

(21) Appl. No.: 15/234,099

(22) Filed: Aug. 11, 2016

(65) Prior Publication Data

US 2017/0094282 A1 Mar. 30, 2017

(30) Foreign Application Priority Data

Sep. 25, 2015 (JP) ................. 2015-188351

(51) Int. Cl.
*H04N 13/246* (2018.01)
*H04N 13/161* (2018.01)
(Continued)

(52) U.S. Cl.
CPC ......... *H04N 13/246* (2018.05); *H04N 13/161* (2018.05); *H04N 13/167* (2018.05);
(Continued)

(58) Field of Classification Search
CPC .. H04N 19/115; H04N 9/8205; H04N 21/242; H04N 13/161; H04N 13/167;
(Continued)

(56) References Cited

U.S. PATENT DOCUMENTS 4,562,463 A * 12/1985 Lipton ................. H04N 13/398
348/56
5,475,419 A * 12/1995 Carbery ............... H04N 13/167
348/59
(Continued)

FOREIGN PATENT DOCUMENTS

EP 2124446 A1 * 11/2009 ......... H04N 21/4122
JP 2005-167397 6/2005
(Continued)

OTHER PUBLICATIONS

Natural Instruments Community Discussion Forums, "How to determine the accuracy of the frame rate using a Basler sca640-70gm?", https://forums.ni.com/t5/Machine-Vision/How-to-determine-the-accuracy-of-the-frame-rate-using-a-Basler/td-p/967721 (last post Dec. 13, 2011) (Year: 2011).*

(Continued)

*Primary Examiner* — David N Werner
(74) *Attorney, Agent, or Firm* — Staas & Halsey LLP (57) ABSTRACT

An encoder apparatus includes a memory and a processor to receive video data including a plurality of frames that have been captured in multiple imaging directions in a time series; to separate the frames included in the received video data, by the imaging directions; to store, for each of the imaging directions, the separated frames in the memory; to calculate, for each of the imaging directions, based on sequence numbers of the frames stored in the memory before separation, a frame rate of the video data including the frames; and to encode, for each of the imaging directions, the video data that includes the frames stored in the memory at the frame rate calculated with respect to the imaging direction, and to output the encoded video data.

12 Claims, 8 Drawing Sheets

(51) Int. Cl.
  *H04N 13/167* (2018.01)
  *H04N 19/88* (2014.01)
  *H04N 19/146* (2014.01)
  *H04N 13/117* (2018.01)
  *H04N 13/106* (2018.01)
  *H04N 13/139* (2018.01)

(52) U.S. Cl.
  CPC .......... *H04N 19/146* (2014.11); *H04N 19/88* (2014.11); *H04N 13/117* (2018.05); *H04N 13/139* (2018.05); *H04N 13/158* (2018.05)

(58) Field of Classification Search
  CPC .. H04N 13/158; H04N 13/138; H04N 13/111; H04N 13/246
  See application file for complete search history.

(56) References Cited

U.S. PATENT DOCUMENTS

| | | | | |
|---|---|---|---|---|
| 5,481,543 A | * | 1/1996 | Veltman | H04N 5/9206 348/423.1 |
| 5,661,518 A | * | 8/1997 | Palm | H04N 5/4401 348/42 |
| 2005/0270284 A1 | * | 12/2005 | Martin | H04N 13/221 345/419 |
| 2009/0179982 A1 | | 7/2009 | Yanagisawa et al. | |
| 2010/0254455 A1 | * | 10/2010 | Matsunaga | G11B 27/10 375/240.12 |
| 2014/0153909 A1 | * | 6/2014 | MacInnis et al. | H04N 19/436 386/353 |
| 2016/0360185 A1 | * | 12/2016 | Margalit | H04N 13/271 |
| 2017/0078649 A1 | * | 3/2017 | Taubin | G06T 7/521 |

FOREIGN PATENT DOCUMENTS

| | | |
|---|---|---|
| JP | 2007-184891 | 7/2007 |
| JP | 2009-188975 | 8/2009 |

OTHER PUBLICATIONS

Espacenet Bibliographic Data, Japanese Publication No. 2009-188975, published Aug. 20, 2009.

Espacenet Bibliographic Data, Japanese Publication No. 2007-184891, published Jul. 19, 2007.

Espacenet Bibliographic Data, Japanese Publication No. 2005-167397, published Jun. 23, 2005.

* cited by examiner

ENCODER APPARATUS, ENCODER SYSTEM, ENCODING METHOD, AND MEDIUM FOR SEPARATING FRAMES CAPTURED IN TIME SERIES BY IMAGING DIRECTIONS

CROSS-REFERENCE TO RELATED APPLICATIONS

This application is based on and claims the benefit of priority of Japanese Priority Application No. 2015-188351 filed on Sep. 25, 2015, with the Japanese Patent Office, the entire contents of which are hereby incorporated by reference.

FIELD

The following disclosure relates to an encoder apparatus, an encoder system, an encoding method, and a medium.

BACKGROUND

In various places, a considerable number of fixed point cameras are installed that are managed by national governments and local governments. There has been demand for such fixed point cameras to be used in diversified applications. For example, one may consider having a fixed point camera rotate to capture videos in multiple directions so that the videos can be distributed for multiple applications.

RELATED-ART DOCUMENTS

Patent Documents

[Patent Document 1] Japanese Laid-open Patent Publication No. 2009-188975
[Patent Document 2] Japanese Laid-open Patent Publication No. 2007-184891
[Patent Document 3] Japanese Laid-open Patent Publication No. 2005-167397

However, for a viewer of a video that is being captured when a camera is directed in a certain direction (referred to as a "direction A", below), it may not be preferable that another video captured in another direction (referred to as a "direction B", below) is intermingled. For example, assume that a video is being distributed to a broadcasting station to be used by the broadcasting station to make a report on a place, and if the direction of the video suddenly changes during the broadcast, viewers may be confused.

SUMMARY

According to an embodiment, an encoder apparatus includes a memory and a processor. The processor is configured to receive video data including a plurality of frames that have been captured in a plurality of imaging directions in a time series; to separate the frames included in the received video data, by the imaging directions; to store, for each of the imaging directions, the separated frames in the memory; to calculate, for each of the imaging directions, based on sequence numbers of the frames stored in the memory before separation, a frame rate of the video data including the frames with respect to the imaging direction; and to encode, for each of the imaging directions, the video data that includes the frames stored in the memory with respect to the imaging direction, at the frame rate calculated with respect to the imaging direction, and to output the encoded video data.

The object and advantages of the embodiment will be realized and attained by means of the elements and combinations particularly pointed out in the claims. It is to be understood that both the foregoing general description and the following detailed description are exemplary and explanatory and are not restrictive of the invention as claimed.

DESCRIPTION OF EMBODIMENTS

Figure 1:
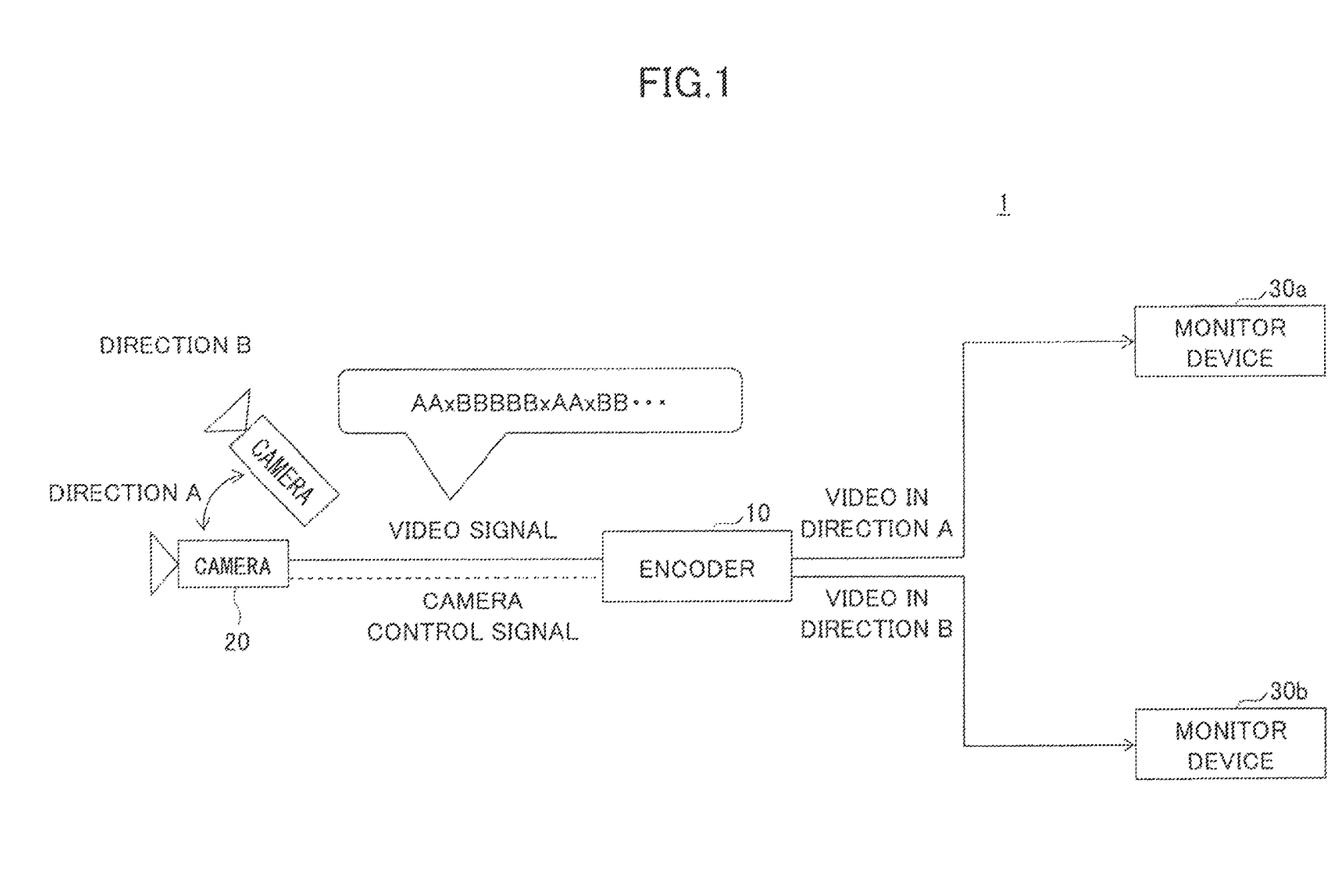
FIG. 1 is a diagram that illustrates an example of a configuration of a video distribution system according to an embodiment of the present invention.

In the following, embodiments of the present invention will be described with reference to the drawings. FIG. 1 is a diagram that illustrates an example of a configuration of a video distribution system 1 according to an embodiment of the present invention. In FIG. 1, a video distribution system 1 includes a camera 20, an encoder 10, and multiple monitor devices 30 such as a monitor device 30a and a monitor device 30b. The camera 20 and the encoder 10 are connected by a network (either wired or wireless) to distribute videos captured by the camera 20. Also, the encoder 10 and the monitor devices 30 are connected by a network (either wired or wireless) to transmit videos captured by the camera 20.

The camera 20 is a monitor camera that may be installed, for example, in a town. The camera 20 may be, for example, a CCTV (Closed Circuit Television) camera. In the embodiment, the camera 20 can change the imaging direction, for example, by turning around (rotation). FIG. 1 illustrates an example in which the camera 20 changes the imaging direction periodically in two directions, a direction A and a direction B, to execute imaging. Consequently, video data is transmitted from the camera 20 to the encoder 10, which includes frames in the different imaging directions in a time series. In FIG. 1, a string "AAxBBBBBxAAxBB . . . " represents imaging directions of respective frames included in video data. A character "A" represents a frame captured in the direction A. A character "B" represents a frame captured in the direction B. A character "x" represents a frame captured while the camera 20 is turning around.

Therefore, the example in FIG. 1 illustrates that the video data is constituted with cycles of frames where one cycle includes two frames captured in the direction A; one frame captured while turning around from the direction A to the direction B; five frames captured in the direction B; and one frame captured while turning around from the direction B to the direction A. Here, one cycle is a period during which the camera 20 having been facing a direction, turns around and returns to the position facing the direction.

The encoder 10 is an apparatus for encoding video data captured by the camera 20, by a predetermined method. The encoder 10 distributes encoded video data to the monitor devices 30. The example in FIG. 1 illustrates that the single camera 20 is connected on the input side of the encoder 10, and two monitor devices 30 are connected on the output side. However, the number of cameras 20 connected on the input side, and the number of monitor devices 30 connected on the output side are not limited to predetermined numbers. Note that the encoder 10 distributes a video captured in a direction A (video in direction A) to the monitor device 30a, and distributes a video captured in a direction B (video in direction B) to the monitor device 30b.

The monitor devices 30 are terminals used for monitoring videos distributed by the encoder 10. The monitor devices 30 may be an application-specific terminal or a general-purpose terminal such as a PC (Personal Computer), a smart phone, a tablet terminal, and the like. Note that the monitor device 30a and the monitor device 30b may be collections of multiple monitor devices 30, respectively.

Figure 2:
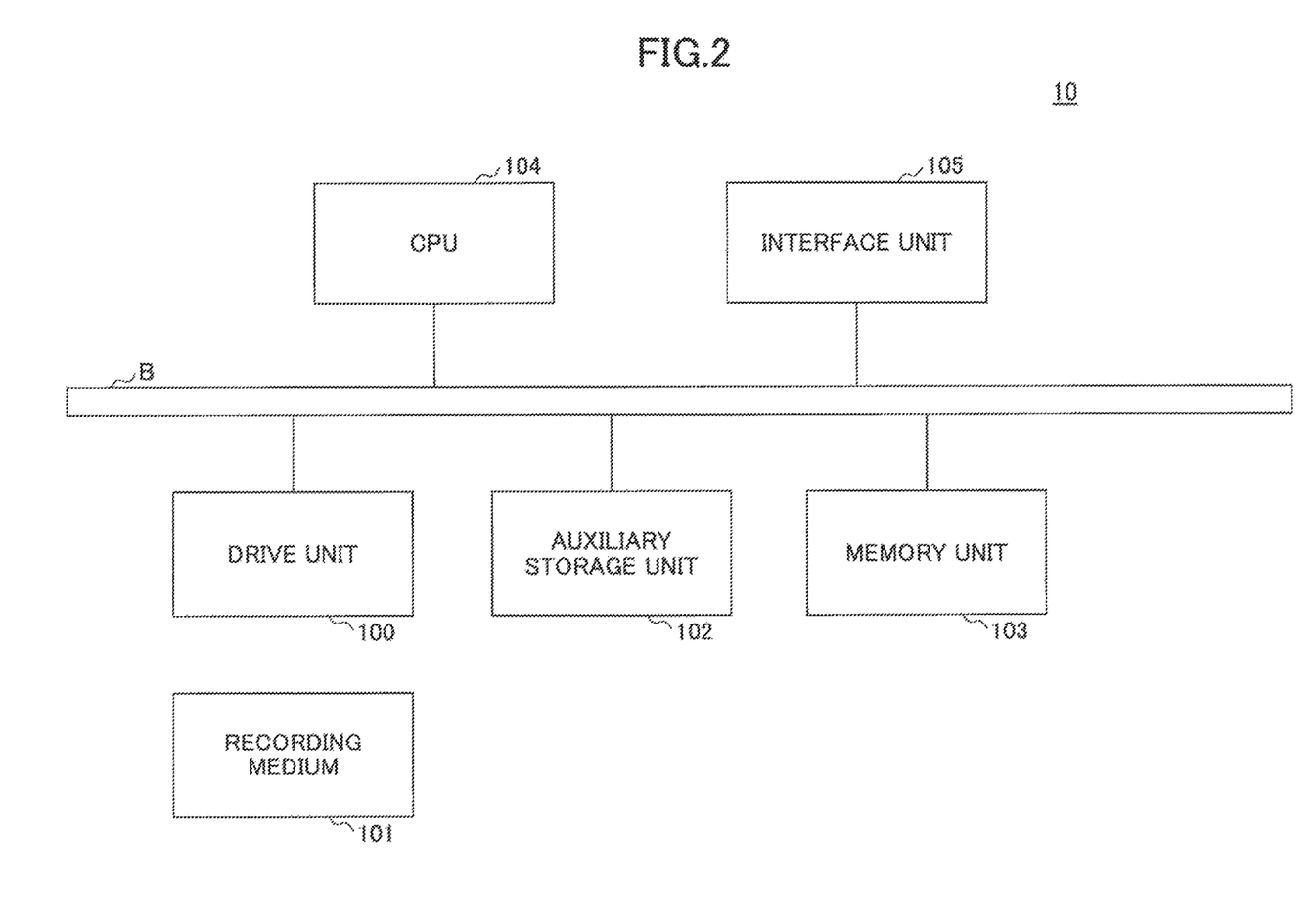
FIG. 2 is a diagram that illustrates an example of a hardware configuration of an encoder according to an embodiment of the present invention.

FIG. 2 is a diagram that illustrates an example of a hardware configuration of the encoder 10 according to the embodiment. The encoder 10 in FIG. 2 includes a drive unit 100, an auxiliary storage unit 102, a memory unit 103, a CPU 104, and an interface unit 105 that are mutually connected by a bus B.

A program that performs processing on the encoder 10 is provided with a recording medium 101. When the recording medium 101 storing the program is set in the drive unit 100, the program is installed into the auxiliary storage unit 102 from the recording medium 101 via the drive unit 100. However, installation of the program is not necessarily executed from the recording medium 101, but may be downloaded from another computer via a network. The auxiliary storage unit 102 stores the installed program, and stores required files, data, and the like as well.

The memory unit 103 reads the program from the auxiliary storage unit 102 to store the program into it when receiving a start command for the program. The CPU 104 implements functions relevant to the encoder 10 by executing the program stored in the memory unit 103. The interface unit 105 is used as an interface for connecting with a network.

Note that an example of the recording medium 101 may be a CD-ROM, a DVD disk, or a portable recording medium such as a USB memory, etc. Also, an example of the auxiliary storage unit 102 may be an HDD (Hard Disk Drive), a flash memory, or the like. Both the recording medium 101 and the auxiliary storage unit 102 correspond to computer-readable recording media.

Figure 3:
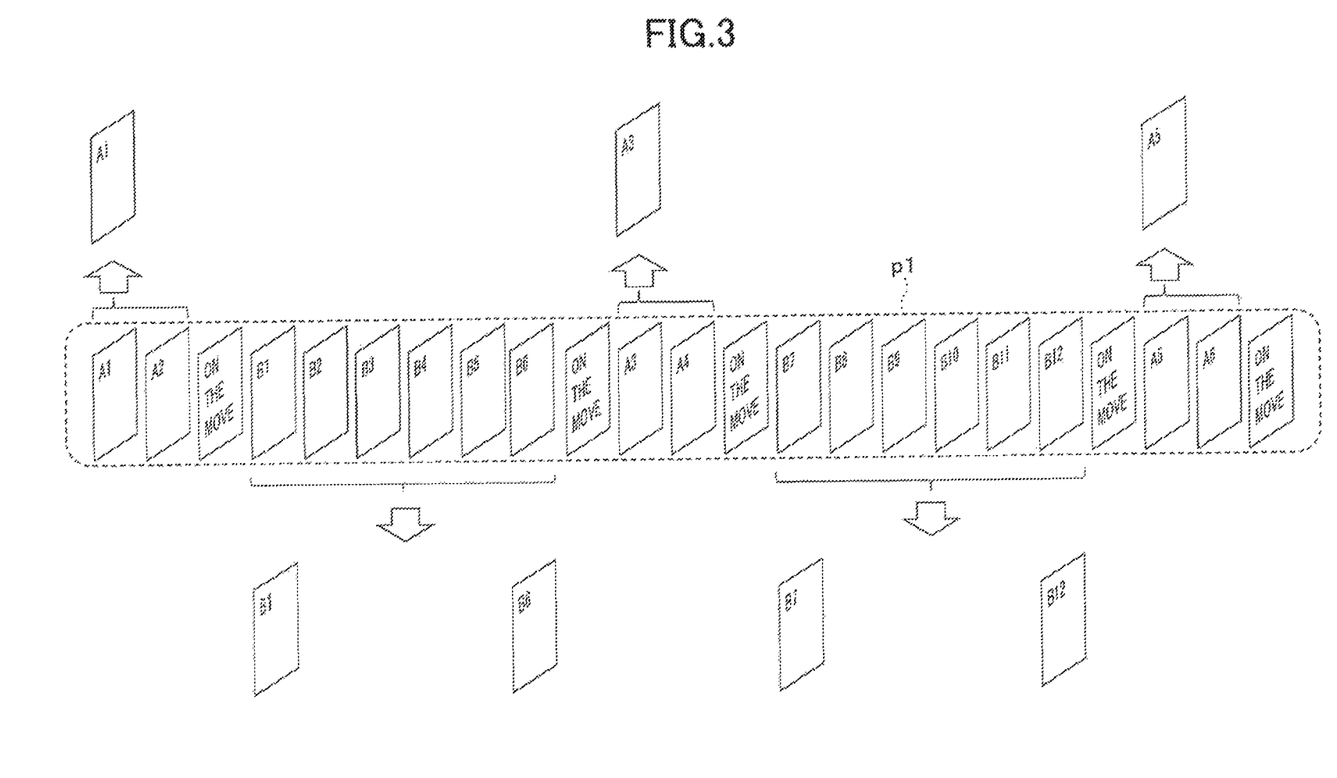
FIG. 3 is a diagram for describing an overview of a process executed by an encoder according to an embodiment of the present invention.

FIG. 3 is a diagram for describing an overview of a process executed by the encoder 10 according to the embodiment.

FIG. 3 illustrates frames designated by tilted rectangles that constitute video data p1 having been input into the encoder 10 from the camera 20. Among the rectangles, rectangles designated with "on the move" are frames that has been captured while the camera 20 was turning around (referred to as "frames on the move", below). A rectangle designated with "Ax" is a frame that has been captured in the direction A (referred to as a "frame A", below). A rectangle designated with "Bx" is a frame that has been captured in the direction B (referred to as a "frame B", below). Note that "x" in "Ax" represents a sequence number among frames A. Also, "x" in "Bx" represents a sequence number among frames B. A cycle of frames in FIG. 3 is the same as in FIG. 1. In other words, two frames A, a frame on the move (from the direction A to the direction B), six frames B, and a frame on the move (from the direction B to the direction A) constitute a group of frames in a cycle.

If the video data p1 has the cycle illustrated in FIG. 3, the encoder 10 distributes video data of frames A, for example, that includes only two leading frames in a cycle to the monitor device 30a. Also, the encoder 10 distributes video data of frames B that includes only the first frame and the last frame in a cycle to the monitor device 30b. In this way, it is possible to even intervals of frames distributed to the respective monitor devices 30 (equal intervals). In other words, to even the respective intervals of frames A and frames B, the encoder 10 thins out frames (or extracts a part of frames). In FIG. 3, intervals of nine frames are set for frames A. Also, intervals of four frames are set for frames B. Consequently, elapsed time between the frames can be made uniform.

Note that if all frames A are distributed to the monitor device 30a, change in a video between the frame A1 and the frame A2 considerably differs from change in the video between the frame A2 and the frame A3. Similarly, if all frames B are distributed to the monitor device 30b, change in a video between the frame B1 and the frame B6 considerably differs from change in the video between the frame B6 and the frame B7. Therefore, viewers may feel that the video looks strange.

Figure 4:
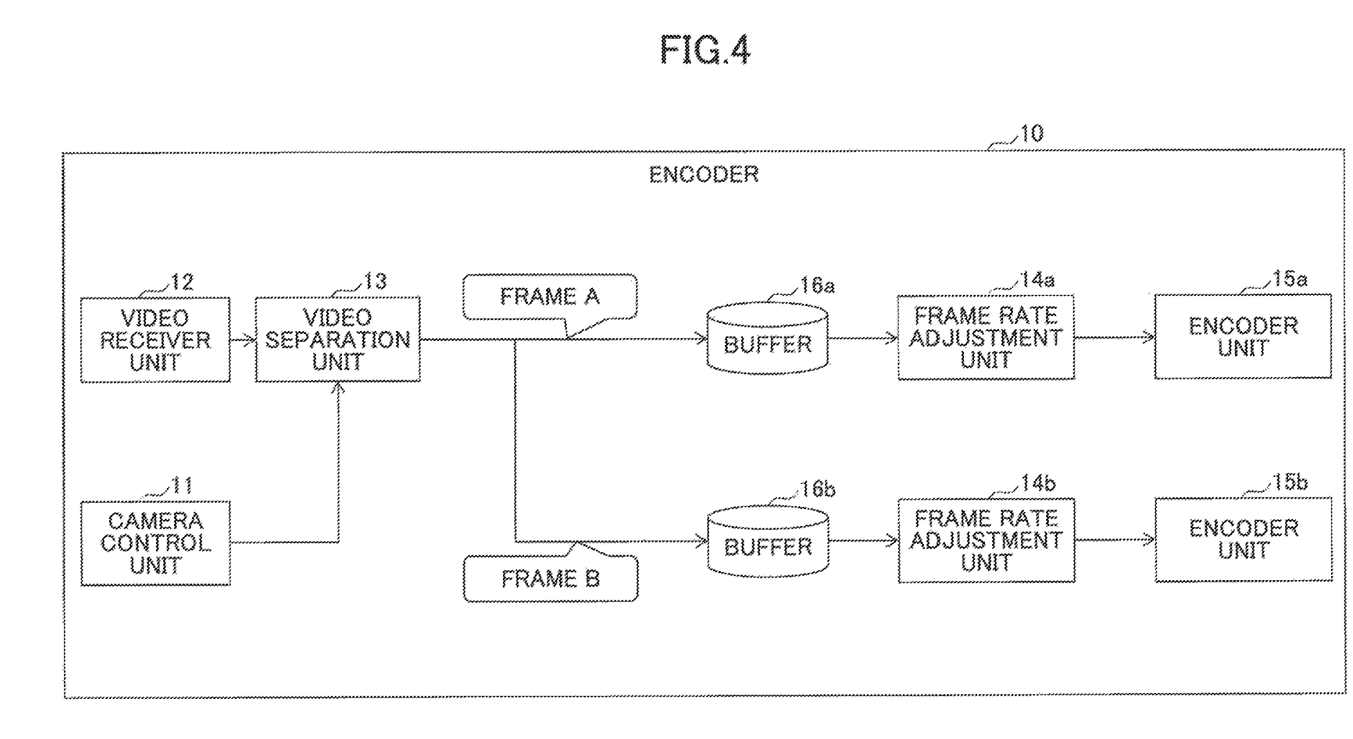
FIG. 4 is a diagram that illustrates an example of a functional configuration of an encoder according to an embodiment of the present invention.

To implement thinning out frames as illustrated in FIG. 3, the encoder 10 may have a functional configuration, for example, as illustrated in FIG. 4.

FIG. 4 is a diagram that illustrates an example of a functional configuration of the encoder 10 according to the embodiment. In FIG. 4, the encoder 10 includes a camera control unit 11, a video receiver unit 12, a video separation unit 13, a frame rate adjustment unit 14a, a frame rate adjustment unit 14b, an encoder unit 15a, and an encoder unit 15b. These units are implemented by processes that one or more programs installed in the encoder 10 has the CPU 104 execute. The encoder 10 also includes a buffer 16a and a buffer 16b. The buffer 16 may be implemented by using, for example, the memory 103 or the auxiliary storage unit 102.

Note that the frame rate adjustment unit 14a, the encoder unit 15a, and the buffer 16a correspond to frames A, and the frame rate adjustment unit 14b, the encoding unit 15b, and the buffer 16 correspond to frames B. The last letters in the codes of the units ("a" and "b") may be omitted if distinction is not required.

The camera control unit 11 controls movement (turning around) of the camera 20. For example, the camera control unit 11 may control the camera 20 in response to a command from another computer that is connected with the encoder 10 via a network. However, movement of the camera 20 is assumed to be cyclic in the embodiment.

The video receiver unit 12 receives video data (a video signal) that has been captured by the camera 20. The video separation unit 13 separates frames that constitute the video data received by the video receiver unit 12 into frames that come from respective common imaging directions. In the embodiment, frames are separated into frames A and frames B. Frames A are stored in the buffer 16*a*. Frames B are stored in the buffer 16*b*.

Based on the sequence numbers of frames stored in the buffer 16 before separation, the frame rate adjustment unit 14 calculates a frame rate, and generates video data at the calculated frame rate. The encoding unit 15 encodes the video data that has been generated by the frame rate adjustment unit 14, and distributes the encoded video data to the monitor device 30.

Figure 5:
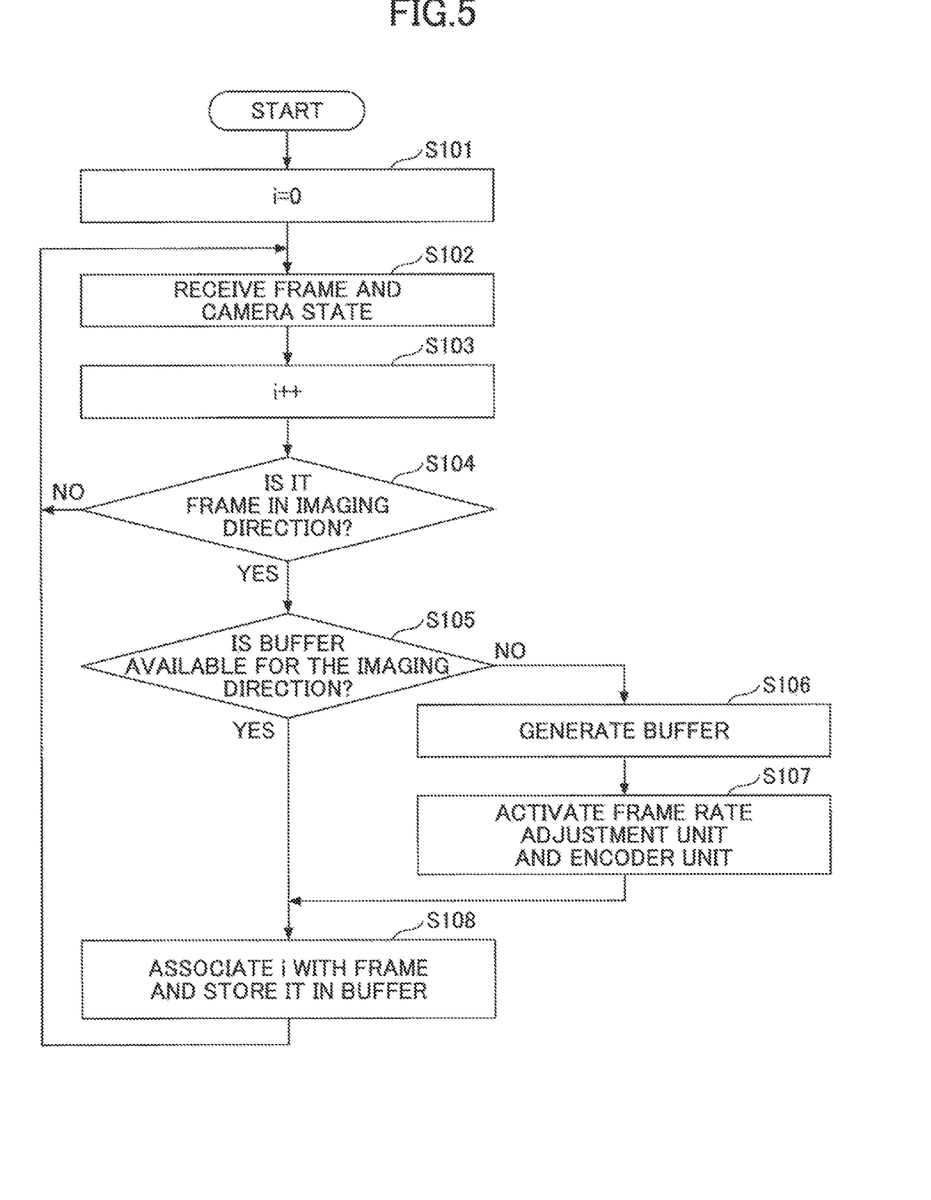
FIG. 5 is a flowchart for describing an example of processing steps executed by an encoder in response to receiving video data.

In the following, processing steps executed by the encoder 10 in FIG. 1 will be described. FIG. 5 is a flowchart for describing an example of processing steps executed by the encoder 10 in response to receiving video data.

At Step S101, the video separation unit 13 sets zero to a variable i. The variable i is a variable to store the sequence number of a frame. Next, the video separation unit 13 receives a frame of video data from the video receiver unit 12, and receives state information of the camera 20 from the camera control unit 11 (Step S102). The video data received from the video receiver unit 12 is, for example, video data that is being captured by the camera 20 at the moment, and received from the camera 20 by the video receiver unit 12. The state information of the camera 20 received from the camera control unit 11 represents a state of the camera 20 at the moment (namely, when the video data is captured). The state information of the camera 20 is information that indicates, for example, whether the camera 20 faces in the direction A or the direction B, or the camera 20 is turning around. Note that the camera control unit 11 recognizes the state of the camera 20 to control operations of the camera 20.

Next, the video separation unit 13 adds one to the variable i (Step S103). Next, the video separation unit 13 determines whether a frame in the received video data (referred to as a "frame to be processed", below) is a frame captured in one of the imaging directions (Step S104). In the embodiment, it is determined whether the frame has been captured in the direction A or the direction B. The determination can be done based on the state information received from the camera control unit 11.

If the frame to be processed is not a frame captured in one of the imaging directions, namely, if the frame to be processed is a frame on the move (NO at Step S104), Steps S105 and after will not be executed. If the frame to be processed is a frame captured in one of the imaging directions (YES at Step S104), the video separation unit 13 determines whether the buffer 16 corresponding to the imaging direction of the frame to be processed exists (Step S105). If the corresponding buffer 16 does not exist (NO at Step S105), the video separation unit 13 generates the corresponding buffer 16 (Step S106). Next, the video separation unit 13 activates the frame rate adjustment unit 14 and the encoding unit 15 that correspond to the buffer 16 (Step S107). For example, if the imaging direction about the frame to be processed is the direction A, the buffer 16*a* is generated, and the frame rate adjustment unit 14*a* and the encoder unit 15*a* are activated. Note that if the imaging directions have been already known by the video separation unit 13, the buffers 16 may be generated in advance, and the frame rate adjustment units 14 and the encoding units 15 that correspond to the respective buffers 16 may be activated in advance.

If it is determined YES at Step S105, or following Step S107, the video separation unit 13 stores the frame to be processed in the buffer 16 that corresponds to the imaging direction about the frame to be processed (Step S108). At this moment, the video separation unit 13 associates the value of the variable i with the frame to be processed. Note that values of the variable i represent sequence numbers of frames before separated by the imaging directions.

Steps S101 and after in FIG. 5 are executed for each of the frames so that the frames included in the video data received from the camera 20 are separated by the imaging directions, and stored in the buffers 16 that correspond to the respective imaging directions.

Figure 6:
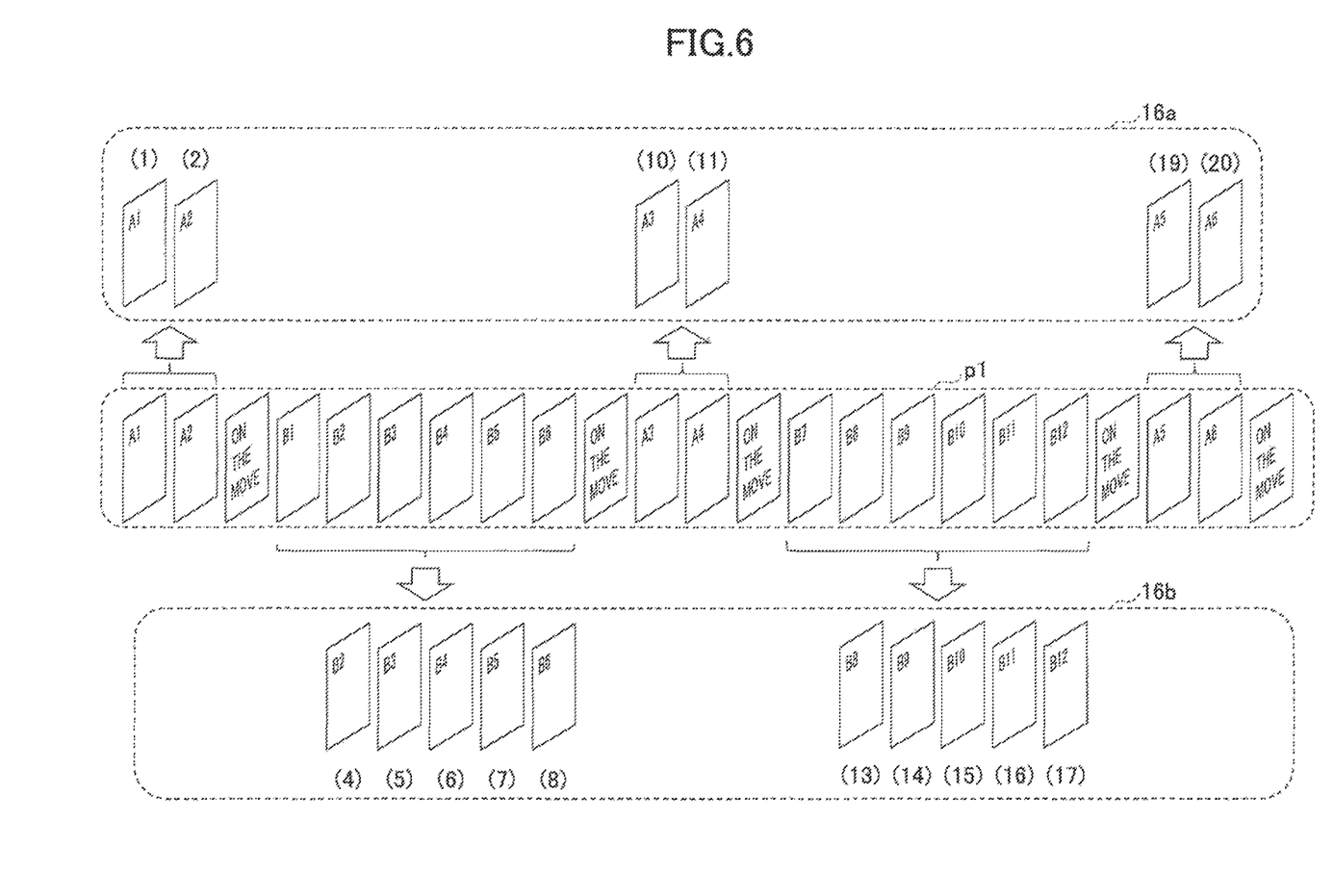
FIG. 6 is a diagram that illustrates an example of states of buffers after frames included in video data have been separated.

FIG. 6 is a diagram that illustrates an example of states of the buffers 16 after frames included in video data have been separated. As illustrated in FIG. 6, among frames included in video data p1, frames A are stored in the buffer 16*a*, and frames B are stored in the buffer 16*b*. Numbers in the parentheses attached to the frames in the buffers 16 represent values of the variable i that are associated with the frames, respectively.

Figure 7:
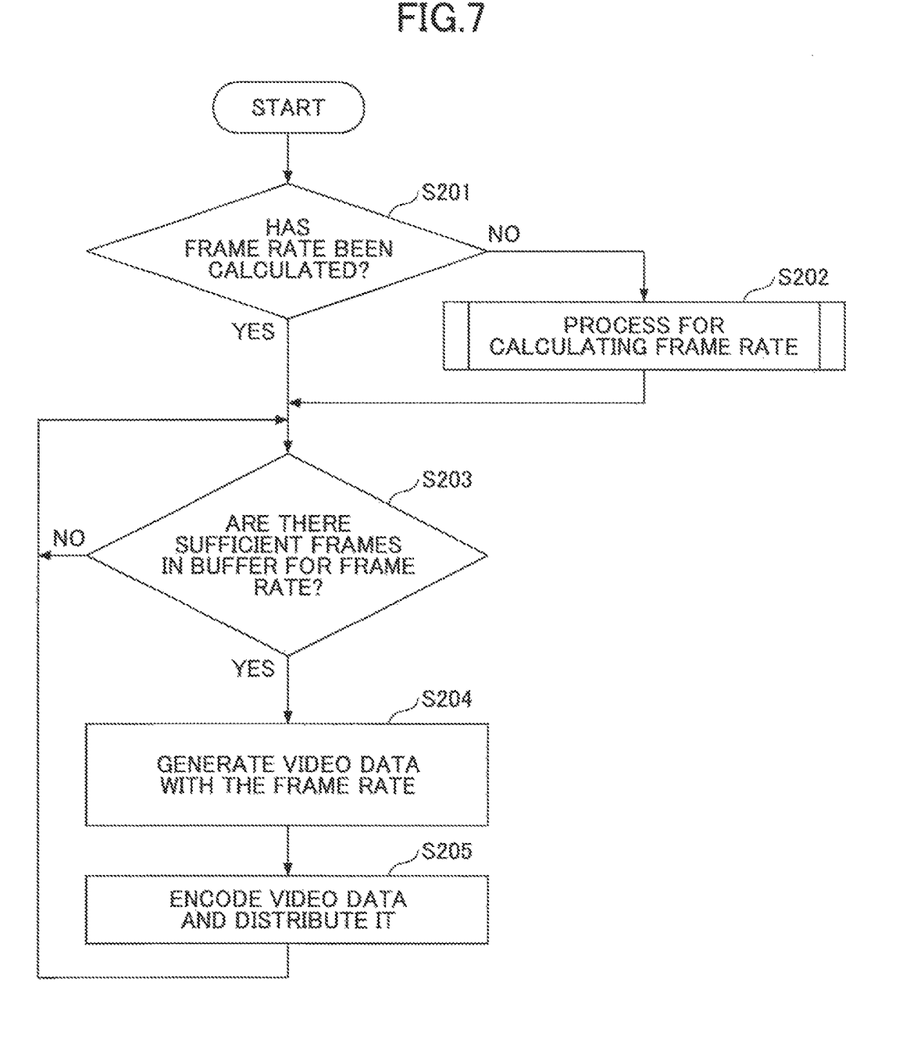
FIG. 7 is a flowchart for describing an example of processing steps executed by an encoder for frames stored in a buffer.

FIG. 7 is a flowchart for describing an example of processing steps executed by the encoder 10 for frames stored in the buffer 16. Note that the process in FIG. 7 is independent of (in parallel with) that in FIG. 5, and is executed by the frame rate adjustment unit 14. Assume that in FIG. 5, the frame rate adjustment unit 14*a* corresponding to the direction A executes the steps.

At Step S201, the frame rate adjustment unit 14*a* determines whether the frame rate of video data distributed with respect to the direction A has been calculated. If the frame rate has not been calculated (NO at Step S201), the frame rate adjustment unit 14*a* executes a process for calculating the frame rate (Step S202). The process for calculating the frame rate will be described later in detail.

If the frame rate has already been calculated (YES at Step S201), or following Step S202, the frame rate adjustment unit 14*a* determines whether the number of frames stored in the buffer 16*a* is sufficient with respect to the frame rate (Step S203). For example, if the frame rate is N fps (where N is a positive integer, and "fps" stands for "frames per second"), the frame rate adjustment unit 14*a* may determine whether N frames have already been stored in the buffer 16*a*. Alternatively, another method may be used to determine whether the number of frames is sufficient.

If the number of frames stored in the buffer 16*a* is not sufficient with respect to the frame rate (NO at Step S203), the frame rate adjustment unit 14*a* waits until a sufficient number of frames are stored in the buffer 16*a*.

If the number of frames stored in the buffer 16*a* is sufficient with respect to the frame rate (YES at Step S203), the frame rate adjustment unit 14 generates video data at the frame rate, by using frames stored in the buffer 16*a* (Step S204). The frames once used for generating the video data are deleted from the buffer 16*a*.

Next, the encoder unit 15*a* encodes the video data, and distributes the encoded video data to the monitor device 30*a* (Step S205).

Note that in the embodiment, the process in FIG. 7 is also executed by the frame rate adjustment unit 14*b* and the encoding unit 15*b*.

Figure 8:
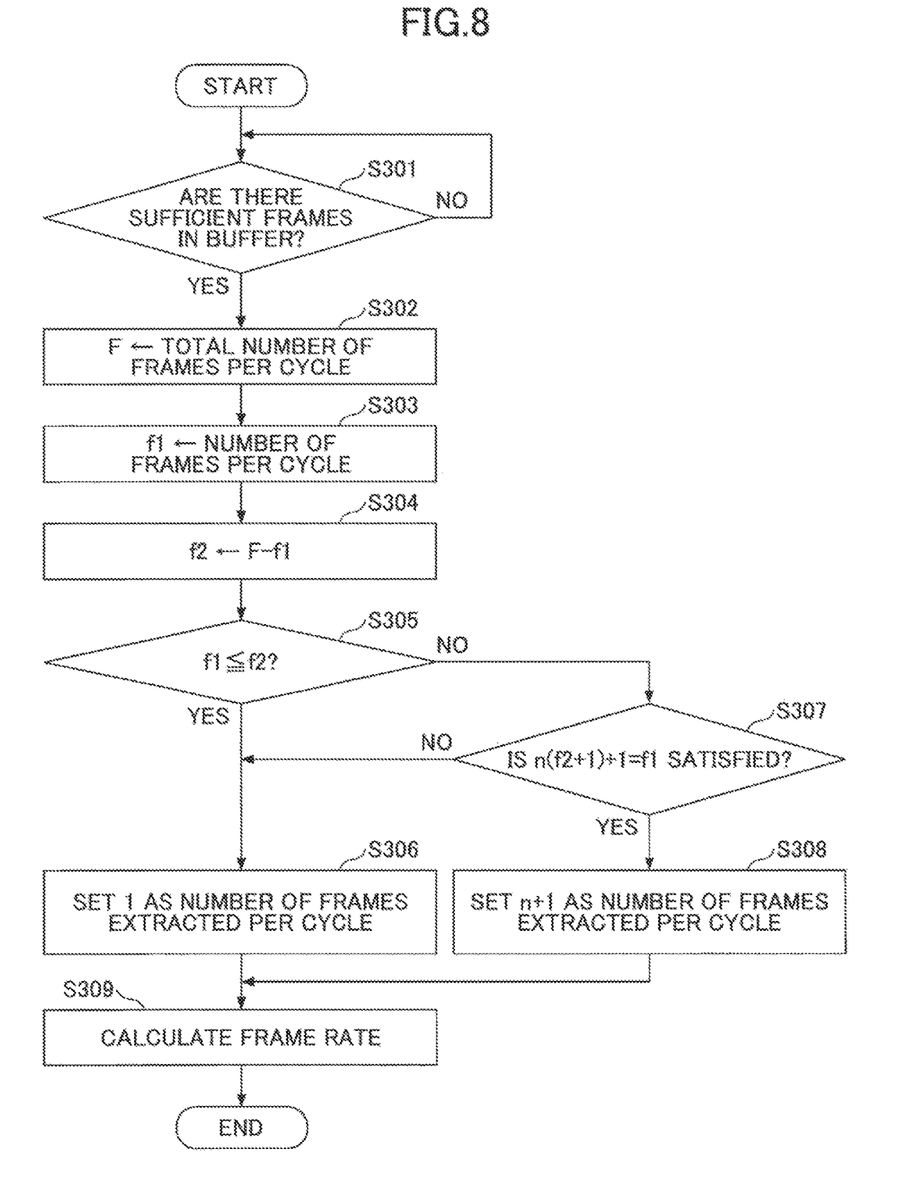
FIG. 8 is a flowchart for describing an example of processing steps for calculating a frame rate.

Next, Step S202 will be described in detail. FIG. 8 is a flowchart for describing an example of processing steps for calculating the frame rate. Here, the processing steps will be described in a case where the frame rate adjustment unit 14*a* executes the steps.

At Step S301, the frame rate adjustment unit 14*a* determines whether a sufficient number of frames for calculating the frame rate have been stored in the buffer 16*a*. The "sufficient number of frames for calculating the frame rate" means frames with which the frame rate adjustment unit 14*a* can identify the total number of frames in a turning-around cycle of the camera 20, and the number of frames in the imaging direction (direction A) to be processed included in the cycle. For example, with respect to the direction A, it is sufficient in FIG. 6 to have frame (1), frame (2), and frame (10) stored in the buffer 16a. Based on the sequence numbers associated with frame (10) and frame (1), respectively, it is possible to determine that the total number of frames in a turning-around cycle is 10−1+1=10. Also, based on frame (1) and frame (2), it is possible to determine that the number of frames A included in the cycle is two.

In other words, it may be sufficient to know a consecutive number of frames and a non-consecutive number of frames in an imaging direction to be processed. The consecutive number is the number of frames A in a cycle. The non-consecutive number is the number of frames between the last frame A in a cycle and the first frame A in the next cycle. In FIG. 6, the consecutive number of the frames A is two, and the non-consecutive number is eight. The total number of frames per cycle is 2+8=10, and the number of frames A per cycle is two which is the consecutive number.

If a sufficient number of frames for calculating the frame rate have been stored in the buffer 16a (YES at Step S301), the frame rate adjustment unit 14a sets the total number of frames per cycle to a variable F (Step S302). Next, the frame rate adjustment unit 14a sets the number of frames A per cycle to a variable f1 (Step S303). Next, the frame rate adjustment unit 14a calculates F−f1, and sets the result to a variable f2 (Step S304). In other words, the variable f2 represents the number of frames per cycle excluding frames A. In the example in FIG. 6, F=10, f1=2, and f2=8 are set.

Next, the frame rate adjustment unit 14a compares the value of the variable f1 with the value of the variable f2 (Step S305). As for the frames A, f1≤f2 is satisfied. Therefore, in this case (YES at Step S305), the frame rate adjustment unit 14a sets one as the number of frames A to be extracted among frames in a cycle, and to be distributed (Step S306). In other words, since the number of frames A per cycle is two, one frame is determined to be thinned out. At this moment, the frame rate adjustment unit 14a determines positions of frames A to be extracted in each cycle so that the intervals between the extracted frames A become even. In the example in FIG. 6, the consecutive number of frames A is two. Therefore, the first frame A in each cycle is determined to be thinned out. This makes it possible to even the interval between the extracted frames A (or the number of frames existing between the extracted frames A), which is nine in the example in FIG. 6. Alternatively, the second frame A may be extracted in each cycle.

Next, based on the number of frames extracted per cycle, the frame rate adjustment unit 14 calculates the frame rate (Step S309). The frame rate x may be calculated, for example, by solving the following equation (1).

$$(\text{frames extracted per cycle})/F = x/(\text{frame rate of received video}) \quad (1)$$

Here, if the frame rate of a received video is 29.94 fps, and the values of f1 and F are those described above, the equation is specifically obtained as follows.

$$1/10 = x/29.94$$

By solving the equation, x is obtained as follows.

$$x = 29.94/10 = 2.994 \text{ fps}$$

Next, the processing steps in FIG. 8 will be described in a case where the frame rate adjustment unit 14b executes the steps. In this case, in the example in FIG. 6, F=10, f1=6, and f2=4 are set. Therefore, it is determined f1>f2 at Step S305. In this case (NO at Step S305), the frame rate adjustment unit 14b determines whether the following formula (2) is satisfied.

$$n \times (f2+1) + 1 = f1 \quad (2)$$

where n is an arbitrary positive integer (1, 2, 3, . . . ). In the example in FIG. 6, since f1=6 and f2=4 are set, the value of both sides is six when n=1, and the above formula is satisfied. In this case (YES at Step S307), the frame rate adjustment unit 14b sets n+1 as the number of frames extracted in a cycle (Step S308). Therefore, in the example in FIG. 6, two frames B are extracted per cycle. Also, the frame rate adjustment unit 14b determines positions of two frames B to be extracted in each cycle so that the intervals between the extracted frames B become even. In the example in FIG. 6, the first frame B and the last frame B are to be extracted in each cycle. Thus, the interval between the frames B can be set to four frames. In other words, the interval between the first frame B and the last frame B in a cycle is four frames, and the interval between the last frame B in a cycle and the first frame B in the next cycle is also four frames.

Next, similar to the frame rate adjustment unit 14a, the frame rate adjustment unit 14b calculates the frame rate of frames B based on the equation (1) (Step S309). With respect to the frames B, the following equation is solved.

$$2/10 = x/29.94$$

By solving the equation, x is obtained as follows.

$$x = 2 \times 29.94/10 = 5.848 \text{ fps}$$

Note that if the consecutive number of the frames B is 11, namely, f1=11 and f2=4 are set, the formula (2) is satisfied if n is two. In other words, in this case, the value of both sides is nine. Therefore, in this case, four frames B are extracted per cycle. To even the interval between the frames B, the first, sixth, and eleventh frames B are extracted in each cycle. Thus, the interval between the frames B can be set four frames. In other words, the formula (2) is a conditional formula to determine whether frames can be extracted to realize even intervals.

On the other hand, if the formula (2) is not satisfied by any value given to n (NO at Step S307), Steps S306 and after are executed. For example, if f1 is five, the formula is not satisfied. Therefore, in this case, one frame B is extracted in each cycle.

However, even if f1 is five, by extracting the first and fifth frames B, the intervals of the frames B become four, three, four, three, and so on, which are nearly even. In other words, the interval between the last frame B in a cycle and the first frame B in the next cycle is four frames, and the interval between the first frame B and the last frame B in the next cycle is three frames. Still in this case, the intervals of the extracted frames can be expected to have higher uniformity compared to a case without thinning-out. Therefore, the number of extracted frames is not necessarily determined based on the formula (2) as long as the intervals of the frames B can be made nearly even, and another method may be used for determining the number of extracted frames and positions of frames B to be extracted.

As described above, according to the embodiment, frames included in video data in multiple directions captured by the camera 20 in a time series are separated by the imaging directions. Also, the frames separated by the imaging directions are encoded at the frame rated calculated based on the sequence numbers of the frames before separation, to be distributed to the monitor devices 30 corresponding to the respective imaging directions. Therefore, a video from the camera 20 that captures images in multiple directions in a time series can be output for each of the directions.

Note that in the embodiment, although examples have been described in which imaging directions of the camera 20 are two directions, the embodiment may be applied to a camera 20 that captures images in imaging directions in a time series, for three or more directions.

Note that in the embodiment, the camera 20 is an example of an imaging device. The encoder 10 is an example of an encoder apparatus. The video receiver unit 12 is an example of a receiver unit. The video separation unit 13 is an example of a separation unit. The frame rate adjustment unit 14 is an example of a calculation unit. The encoding unit 15 is an example of an encoder unit. The buffer 16 is an example of a storage unit.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An encoder apparatus, comprising:
a memory; and
a processor coupled to the memory and the processor configured to
receive video data including frames that have been captured by periodically changing an imaging direction in a time series;
determine whether a part of the frames included in the received video data indicates one of two or more specific directions in the periodically changing imaging direction in the time series;
separate, for each of the two or more specific directions, the part of the frames;
store, for each of the two or more specific directions, the separated frames in the memory;
calculate, for each of the two or more specific directions, based on an order of receiving the frames stored in the memory, a frame rate of partial video data including the part of frames corresponding to a specific direction; and
encode, for each of the imaging directions, the partial video data that includes the separated frames corresponding to the specific direction stored in the memory, at the frame rate calculated with respect to the specific direction, and output the encoded partial video data.

2. The encoder apparatus as claimed in claim 1, wherein the processor extracts, for each of the two or more specific directions, based on the order of receiving the frames stored in the memory, the part of the frames among the frames included in the received video data, and then, calculates the frame rate with respect to the extracted frames.

3. The encoder apparatus as claimed in claim 2, wherein the processor extracts the part of the frames so as to even intervals between the extracted frames before the separation.

4. An encoder system, comprising:
an imaging device configured to capture a video in a plurality of imaging directions by periodically changing an imaging direction in a time series; and
an encoder apparatus,
wherein the encoder apparatus includes
a memory; and
a processor coupled to the memory and the processor configured to
receive video data including frames that have been captured by the imaging device,
determine whether a part of the frames included in the received video data indicates one of two or more specific directions in the periodically changing imaging direction in the time series;
separate, for each of the two or more specific directions, the part of the frames;
store, for each of the two or more specific directions, the separated frames in the memory;
calculate, for each of the two or more specific directions, based on an order of receiving the frames stored in the memory, a frame rate of partial video data including the part of frames corresponding to a specific direction; and
encode, for each of the imaging directions, the partial video data that includes the separated frames corresponding to the specific direction stored in the memory, at the frame rate calculated with respect to the specific direction, and output the encoded partial video data.

5. The encoder system as claimed in claim 4, wherein the processor extracts, for each of the two or more specific directions, based on the order of receiving the frames stored in the memory, the part of the frames among the frames included in the received video data, and then, calculates the frame rate with respect to the extracted frames.

6. The encoder system as claimed in claim 5, wherein the processor extracts the part of the frames so as to even intervals between the extracted frames before the separation.

7. An encoding method, executed by an encoder apparatus, the method comprising:
receiving video data including frames that have been captured by periodically changing an imaging direction in a time series;
determining whether a part of the frames included in the received video data indicates one of two or more specific directions in the periodically changing imaging direction in the time series;
separating, for each of the two or more specific directions, the part of the frames;
storing, for each of the two or more specific directions, the separated frames in the memory;
calculating, for each of the two or more specific directions, based on an order of receiving the frames stored in the memory, a frame rate of partial video data including the part of frames corresponding to a specific direction; and
encoding, for each of the imaging directions, the partial video data that includes the separated frames corresponding to the specific direction stored in the memory, at the frame rate calculated with respect to the specific direction, and outputting the encoded partial video data.

8. The encoding method as claimed in claim 7, wherein the calculating extracts, for each of the two or more specific directions, based on the order of receiving the frames stored in the memory, the part of the frames among the frames included in the received video data, and then, calculates the frame rate with respect to the extracted frames.

9. The encoding method as claimed in claim 8, wherein the calculating extracts the part of the frames so as to even intervals between the extracted frames before the separation.

10. A non-transitory computer-readable recording medium having a program stored therein for causing an encoder apparatus to execute a process, the process comprising:
- receiving video data including frames that have been captured by periodically changing an imaging direction in a time series;
- determining whether a part of the frames included in the received video data indicates one of two or more specific directions in the periodically changing imaging direction in the time series;
- separating, for each of the two or more specific directions, the part of the frames;
- storing, for each of the two or more specific directions, the separated frames in the memory;
- calculating, for each of the two or more specific directions, based on an order of receiving the frames stored in the memory, a frame rate of partial video data including the part of frames corresponding to a specific direction; and
- encoding, for each of the imaging directions, the partial video data that includes the separated frames corresponding to the specific direction stored in the memory, at the frame rate calculated with respect to the specific direction, and outputting the encoded partial video data.

11. The non-transitory computer-readable recording medium as claimed in claim 10, wherein the calculating extracts, for each of the two or more specific directions, based on the order of receiving the frames stored in the memory, the part of the frames among the frames included in the received video data, and then, calculates the frame rate with respect to the extracted frames.

12. The non-transitory computer-readable recording medium as claimed in claim 11, wherein the calculating extracts the part of the frames so as to even intervals between the extracted frames before the separation.

* * * * *